United States Patent
Endres et al.

(10) Patent No.: US 9,808,995 B2
(45) Date of Patent: Nov. 7, 2017

(54) METHOD AND APPARATUS FOR REINFORCING A SUBSTRATE OR A FABRIC IN A CORE STRUCTURE OF A COMPONENT

(75) Inventors: Gregor Christian Endres, Pfaffenhofen (DE); Hans-Jurgen Weber, Verden (DE)

(73) Assignee: Airbus Operations GmbH, Hamburg (DE)

( * ) Notice: Subject to any disclaimer, the term of this patent is extended or adjusted under 35 U.S.C. 154(b) by 318 days.

(21) Appl. No.: 13/097,963

(22) Filed: Apr. 29, 2011

(65) Prior Publication Data
US 2011/0258854 A1 Oct. 27, 2011

Related U.S. Application Data

(63) Continuation of application No. PCT/EP2009/064157, filed on Oct. 27, 2009.
(Continued)

(30) Foreign Application Priority Data

Oct. 30, 2008 (DE) .............. 10 2008 043 314

(51) Int. Cl.
*B29C 70/24* (2006.01)
*B29D 99/00* (2010.01)
(Continued)

(52) U.S. Cl.
CPC .......... *B29C 70/24* (2013.01); *B29D 99/0021* (2013.01); *B21G 3/20* (2013.01);
(Continued)

(58) Field of Classification Search
CPC ... B21G 3/20; B21G 3/22; B21G 3/26; B21G 3/32; B23P 19/004; B23P 19/022;
(Continued)

(56) References Cited

U.S. PATENT DOCUMENTS 3,295,719 A * 1/1967 Kaye et al. ............... 221/277
3,538,673 A * 11/1970 Mosetich ............ B65B 15/04
206/347
(Continued)

FOREIGN PATENT DOCUMENTS

| DE | 10 2006 025 753 A1 | 12/2007 |
|---|---|---|
| EP | 1 213 383 | 6/2002 |
| GB | 2 132 134 A | 7/1984 |

OTHER PUBLICATIONS

German Office Action for German Application No. 10 2008 043 314.4-16 dated Jun. 12, 2009.
(Continued)

*Primary Examiner* — Christopher Besler
(74) *Attorney, Agent, or Firm* — Jenkins, Wilson, Taylor & Hunt, P.A.

(57) ABSTRACT

A method for reinforcing a substrate or textile of a core structure of a component with the following method steps: a continuous semi-finished product is fed, via a feed means, into a cartridge of a conveying means which comprises a plurality of cartridges; the continuous semi-finished product is cut to length using a cutting means in order to produce a cut, reinforcing semi-finished product which is received in the cartridge; the cartridge is conveyed to a machining means; the cut, reinforcing semi-finished product is sharpened using the machining means; the cartridge is conveyed to a textile or substrate to be reinforced of a core structure; and the sharpened semi-finished product is shot into the textile or substrate of a core structure by a stud-shooting means.

13 Claims, 2 Drawing Sheets

Related U.S. Application Data

(60) Provisional application No. 61/109,644, filed on Oct. 30, 2008.

(51) Int. Cl.
*B21G 3/26* (2006.01)
*B21G 3/20* (2006.01)
*B21G 3/22* (2006.01)

(52) U.S. Cl.
CPC ................. *B21G 3/22* (2013.01); *B21G 3/26* (2013.01); *Y02T 50/433* (2013.01); *Y10T 29/49622* (2015.01); *Y10T 29/53* (2015.01)

(58) Field of Classification Search
CPC ...... B21D 43/282; B21D 39/04; B21D 47/04; Y10T 29/49826; Y10T 29/49829; Y10T 29/49831; Y10T 29/49833; Y10T 29/49945; Y10T 29/49947; Y10T 29/53; Y10T 29/53313; Y10T 29/5343; Y10T 29/49629; Y10T 29/49623
USPC .......... 29/897.1, 897, 897.3, 897.32, 897.34, 29/402.09, 402.16, 429, 430, 432; 227/91, 92, 97
See application file for complete search history.

(56) References Cited

U.S. PATENT DOCUMENTS

| | | | |
|---|---|---|---|
| 3,599,686 A * | 8/1971 | Peebles | A47G 1/20 248/301 |
| 4,251,017 A * | 2/1981 | Doyle | B25C 1/003 227/113 |
| 4,501,065 A * | 2/1985 | Zemek et al. | 29/845 |
| 4,505,019 A * | 3/1985 | Deinzer | B21F 27/128 228/120 |
| 4,541,164 A * | 9/1985 | Monzon Indave | 29/430 |
| 4,558,623 A * | 12/1985 | Buchla | G10H 1/344 84/689 |
| 5,152,053 A * | 10/1992 | Vossen | B26D 7/1818 227/128 |
| 5,589,015 A | 12/1996 | Fusco | |
| 5,736,222 A | 4/1998 | Childress | |
| 5,869,165 A | 2/1999 | Rorabaugh et al. | |
| 5,876,652 A | 3/1999 | Rorabaugh et al. | |
| 5,958,550 A | 9/1999 | Childress | |
| 6,027,798 A | 2/2000 | Childress | |
| 6,190,602 B1 | 2/2001 | Blaney et al. | |
| 6,291,049 B1 | 9/2001 | Kunkel et al. | |
| 2002/0052244 A1* | 5/2002 | Halstead et al. | 470/129 |
| 2002/0069503 A1* | 6/2002 | Sentmanat | 29/428 |
| 2002/0166887 A1* | 11/2002 | Matsuoka | B65D 5/0227 229/117 |
| 2005/0115922 A1* | 6/2005 | Mitsui et al. | 216/24 |
| 2006/0121244 A1 | 6/2006 | Godwin et al. | |
| 2007/0029024 A1* | 2/2007 | Johnson et al. | 156/92 |
| 2008/0145592 A1 | 6/2008 | Johnson | |

OTHER PUBLICATIONS

International Search Report for PCT Application No. PCT/EP2009/064157 dated Jul. 22, 2010.
Chinese Office Action for Application No. 200980142220.5 dated Mar. 28, 2013.

* cited by examiner

METHOD AND APPARATUS FOR REINFORCING A SUBSTRATE OR A FABRIC IN A CORE STRUCTURE OF A COMPONENT

CROSS-REFERENCE TO RELATED APPLICATIONS

This application is a continuation of and claims priority to PCT International Application No. PCT/EP2009/064157 filed Oct. 27, 2009, which claims the benefit of and priority to U.S. Provisional Application No. 61/109,644, filed Oct. 30, 2008 and German Patent Application No. 10 2008 043 314.4, filed Oct. 30, 2008, the entire disclosures of which are herein incorporated by reference.

FIELD OF THE INVENTION

The present invention relates to a method and a device for reinforcing a substrate or a textile of a core structure of a component, for example of an aircraft or spacecraft. The invention also relates to a component, for example of an aircraft or spacecraft, and furthermore to an aircraft or spacecraft.

Owing to their particularly good ratio of rigidity or strength to density, core composites enjoy a wide field of application, for example in aviation and aerospace.

Core composites are generally formed of an upper and a lower cover layer or cover ply, between which a honeycomb core structure is arranged which is formed, for example, of vertically extending cells with a hexagonal cross-section in order to increase rigidity.

Foams are a possible alternative. The specific mechanical potential of foams is, however, lower compared with honeycomb structures. Foams are therefore of interest, above all, in the production of components and in the field of increased component properties owing to their multifunctionality for use in core composites, such as for structural applications in aviation or aerospace. Different methods were thus developed in order to increase the mechanical properties of foams without an excessive growth in density. The core is reinforced locally using sewing technology, by the placement of pins or by similar methods without heavily increasing the weight of the structure. In addition, with different methods it is possible to tailor the mechanical properties of the core structure by locally varying the pin density and pin angle to the respective application. In addition to the statically beneficial mechanical properties, these core structures also have a property which is very beneficial for an impact, i.e. collision or extent of the impact damage.

This reinforcing semi-finished product, i.e. pin, is a thin, rod-shaped element of any cross-section. It must exhibit sufficient inherent rigidity for processing. For example, the pins used have a diameter of 0.279 to 0.711 mm.

FIG. 1 shows an example of a known core composite 1 reinforced with semi-finished products 4. A coordinate system x, y, z provides better orientation. In this instance the x-axis corresponds to a longitudinal axis of the core composite, the y-axis corresponds to a vertical axis and the z-axis corresponds to a width axis. The core composite 1 consists of a core structure 2 and respective cover plys 3 of the core structure 2. The core structure 1 is penetrated by pins 4 which, in this instance, are placed at specific angles to the longitudinal axis x and to the vertical axis y, and do not contact one another. The pins may also be arranged at an angle to the width axis z. A further known example is shown in FIG. 2, in which, in contrast to FIG. 1, the ends of the pins have folds 5. Alternatively, the ends can also penetrate into the cover plys 3 (not shown). The manufacturer has the option to design a core which is optimal for each application by varying the local pin density, length, diameter and angle. The possible angles range from perpendicular pins for component regions which are particularly subject to compressive stresses to an angle between 20 . . . 30° for shear reinforcements. Both an isotropic material with a strength ratio of x-axis to z-axis of 1:1 and an anisotropic core at a ratio, for example, of 2:1 or 4:1 can be used as a result of the change to the pin density in the material directions along the x and y-axes (see FIGS. 1 and 2). The pin density can be increased up to a value of, for example, 208 kg/m³.

In the developed method the pins are placed in the foam in an ultrasound-assisted manner and are folded over the surface in a second step.

This method can also be used for three-dimensional reinforcement of textiles as core composites.

An illustrative example is shown in U.S. Pat. No. 6,291, 049 B1 which describes a sandwich structure comprising a large number of discrete pins.

The considerable drawback of this method lies in the high costs generated by long production times.

SUMMARY OF THE INVENTION

The object of the present invention is therefore to provide a method and a device as well as a component and an aircraft or spacecraft, in which the production process is optimised in such a way that the above drawbacks are no longer present or are considerably reduced.

A method for reinforcing a substrate or a textile of a core structure of a component, for example of an aircraft or spacecraft, is accordingly provided and comprises the following method steps. A continuous semi-finished product is fed via a feed means into a cartridge of a conveying means which comprises a plurality of cartridges. It is then cut to length using a cutting means in order to produce a cut, reinforcing semi-finished product which is received in the cartridge. The cartridge is conveyed to a machining means where the cut, reinforcing semi-finished product is sharpened by the machining means. The cartridge is then conveyed further to a substrate or textile to be reinforced of a core structure. The sharpened semi-finished product is shot into the textile or substrate of a core structure using a stud-shooting means.

A method for reinforcing a substrate or a textile of a core structure of a component, for example of an aircraft or spacecraft, is also created, wherein a continuous semi-finished product is fed into a cartridge via a feed means. The free end of the continuous semi-finished product is sharpened by a machining means. The sharpened continuous semi-finished product is then cut to length using a cutting means in order to produce a cut, reinforcing semi-finished product which is received in the cartridge. The cartridge is then conveyed to a textile or substrate to be reinforced of a core structure, where the sharpened semi-finished product is shot into the substrate or textile of a core structure using a stud-shooting means.

A device for reinforcing a substrate or a textile of a core structure of a component, for example of an aircraft or spacecraft, is also provided and comprises a feed means for feeding a continuous semi-finished product to a cartridge. A conveying means comprises this cartridge or a plurality of cartridges. A cutting means for producing a semi-finished product which is received in the cartridge and a cutting means for sharpening the cut, reinforcing semi-finished product are also components of the device. The device also comprises a stud-shooting means for shooting the sharpened semi-finished product into the textile or substrate of a core structure and a conveying means for conveying the cartridge.

An underlying idea of the invention is to shoot the reinforcing semi-finished product into the substrate or textile using a stud-shooting means.

Inter alia, the present invention thus affords the advantage over the approaches mentioned at the outset that, in contrast to an ultrasound-assisted 'sinking in', the shooting in of the semi-finished product using the stud-shooting means is considerably quicker and thus correspondingly reduces the main cost factor of time.

The pin length can be variably adjusted for the semi-finished product by the length-cutting process. The pins can thus have successively different lengths as semi-finished products in the cartridges. Each semi-finished product thus has its own cartridge in a belt system. The continuous semi-finished product is inserted into the cartridge and cut to length. This may also occur simultaneously, side by side in a plurality of positions.

The term "cartridge" is to be understood to mean a component for the temporary accommodation and fixing of the continuous semi-finished product and/or of the semi-finished product. This "cartridge" may comprise, for example, an adhesive in order to fix the respective semi-finished product. Vacuum fixing of the respective semi-finished product may also be possible.

The belt system may transport the cartridges continuously or else intermittently from one station to the next. Buffer stations are also possible. The belt system may also form an endless loop.

The semi-finished product may preferably be sharpened by a cylindrical milling cutter. Cylindrical milling cutters are used, for example, in sharpening machines and are therefore commercially available with a high level of quality and corresponding throughput. Other machining methods, for example oblique trimming with blade formation, or grinding and sanding are, of course, also possible.

The sequence of cutting to length and sharpening can also be switched.

The belt system transports the semi-finished product beneath the stud-shooting means for shooting into the substrate or textile.

The semi-finished product is shot into the textile or substrate of the core structure in previously determinable directions relative to the main axes of the textile or core structure. It is thus possible to produce three-dimensionally reinforced core composites.

It is preferred for the semi-finished products to be shot using a respectively adapted stud of the stud-shooting means. The stud is preferably moved in the longitudinal direction of the semi-finished products. If the semi-finished product is nail-like or needle-like, it is preferred for the stud to have a diameter at its end facing the semi-finished product which basically corresponds to the diameter of the end of the semi-finished product facing the stud.

As a result of this adaptation it is possible to shoot the semi-finished product into the substrate or textile at high speed without causing any damage.

In an alternative embodiment, if the semi-finished product is staple-like then the stud has a width at its end facing the staple-like semi-finished product which basically corresponds to the width of the end of the staple-like semi-finished product facing the stud. In this instance the staples can be used in the belt system as ready-to-use belt products.

The stud-shooting means comprises an electric, pneumatic and/or hydraulic drive. A combination of these drive types can also be possible.

Taking into account the respective material properties, the semi-finished products, i.e. the pins, may consist of all three material classes, for example of FRP (fibre-reinforced plastics material), titanium alloys, glass, SiC (for example Nicalon) or quartz.

A component, for example for an aircraft or spacecraft, comprises at least one portion with a reinforcement of a substrate or of a textile of a core structure, the reinforcement being produced in accordance with one of the methods described above or by the device described above.

A substrate or textile reinforced in this way or the component equipped therewith can be used within a wide field of application, for example lightweight construction, aviation or aerospace, vehicle manufacture, sports equipment and the like.

An aircraft or spacecraft comprises the above-mentioned component.

BRIEF DESCRIPTION OF THE DRAWINGS

In the following, the invention will be described in greater detail on the basis of embodiments with reference to the accompanying figures of the drawings, in which.

DESCRIPTION OF EXEMPLARY EMBODIMENTS

Figure 1:
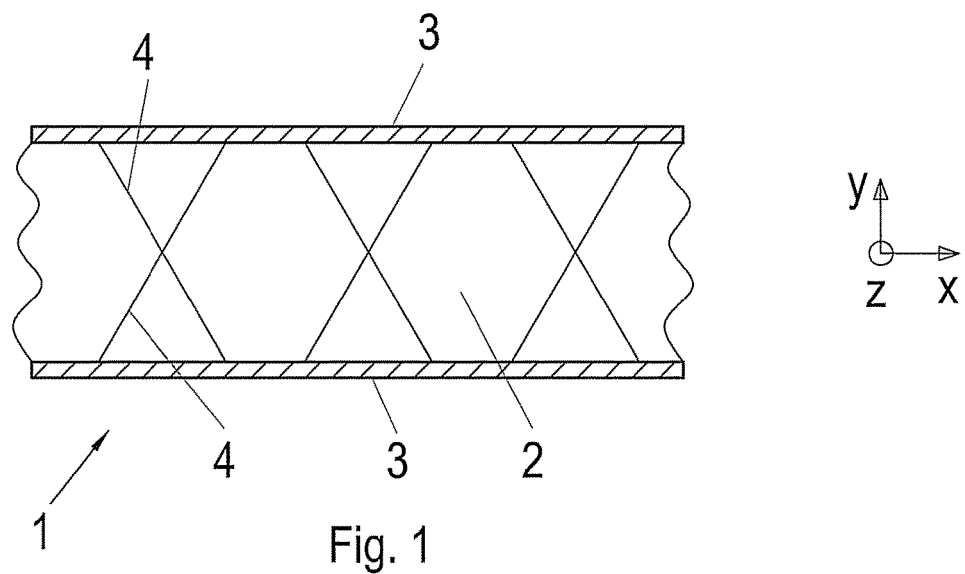
FIG. 1 is a schematic view of a longitudinal section of a first example of a known core composite.

In the figures, like reference numerals denote like or functionally equivalent components, unless indicated otherwise. Furthermore, x, y, z coordinate systems are given in the figures for improved orientation.

Figure 2:
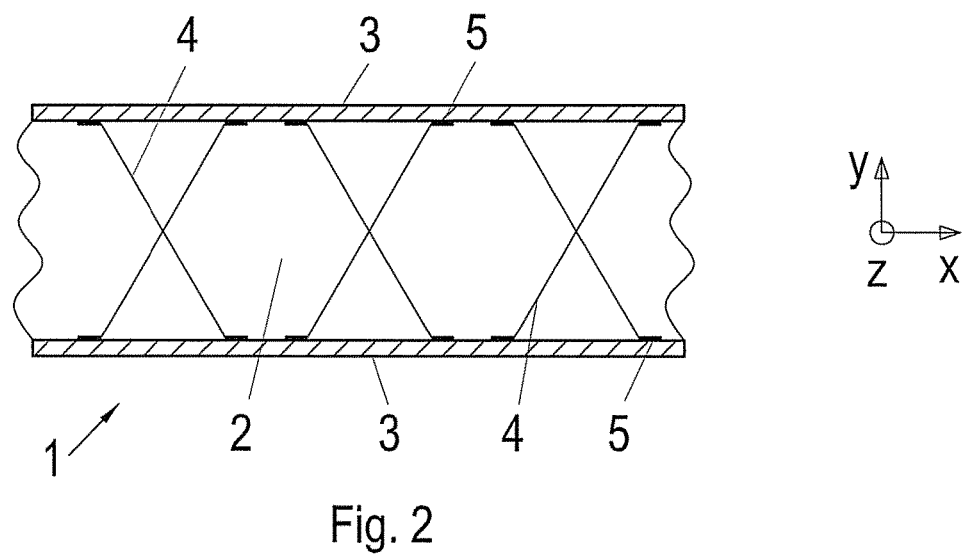
FIG. 2 is a schematic view of a longitudinal section of a second example of a known core composite.

FIGS. 1 and 2 have already been described above and will not be dealt with further here.

Figure 3:
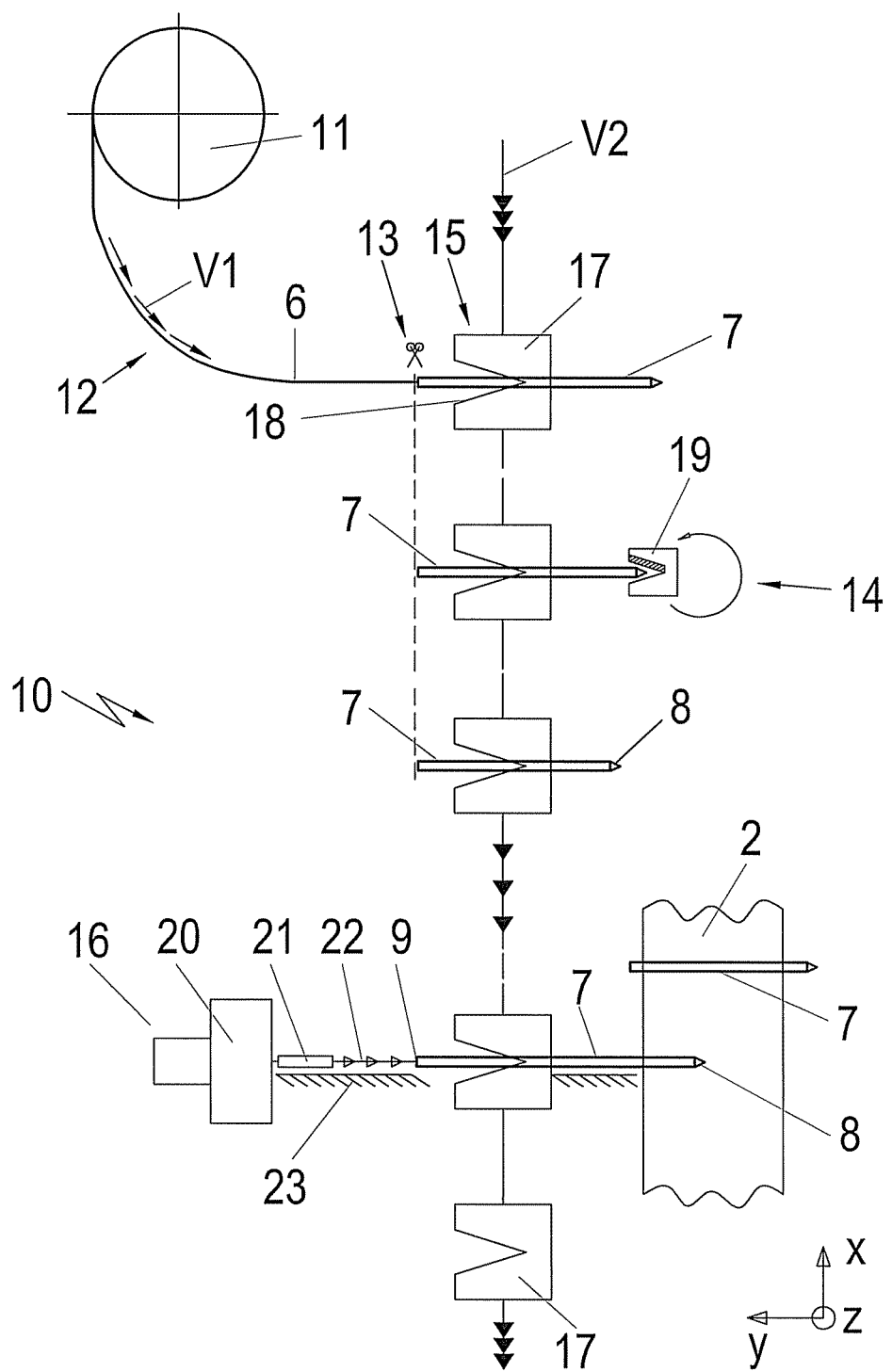
FIG. 3 is a schematic view of an embodiment of a device according to the invention.

FIG. 3 illustrates a schematic view of an embodiment of a device 10 according to the invention.

In this example the device 10 comprises the following: a feed means 12 for feeding a continuous semi-finished product 6 in a continuous semi-finished product feed direction V1, a cutting means 13 for cutting to length the continuous semi-finished product 6 in order to produce semi-finished products 7 of a previously settable length, cartridges 17 for receiving the continuous semi-finished product 6 and the cut semi-finished products 7, a machining means 14 for machining the semi-finished products 7, a stud-shooting means 16 for shooting the semi-finished products 7 into a substrate or a textile of a core structure 2 and a conveying means 15 for conveying the cartridges 17.

The continuous semi-finished product 6 is, in this instance, wound up on a roller as a continuous semi-finished product store 11 and is introduced into a cartridge 17 by the feed means 12, for example a clock-pulse-controlled wire feed, for example similarly to a wire addition material of a welding machine. The cartridge 17 may have, for example, a V-shaped cartridge inlet 18 in order to facilitate the introduction process. Once the previously set length has been reached, the cutting means 13 cuts the continuous semi-finished product 6 in order to produce a cut semi-finished product 7. The length can be set and measured using conventional means.

The cut semi-finished product 7 is then transported to the machining means 14. The conveying means 15 is used for this and continuously transports the cartridge 17 or plurality thereof between the individual stations and in a conveying means feed direction V2 in a type of belt system. The cartridge 17 is stopped at each of the stations. The machining means 14 comprises a machining tool 19 which is a cylindrical milling cutter in this example. In this instance the machining means 14 is a sharpening machine which sharpens one end of the semi-finished product 7 into a point 8 so it can penetrate the core composite 2 in a correspondingly quick manner during the shooting process.

The conveying means then transports the sharpened semi-finished product 7 further to the stud-shooting means 16. A stop 23 may be provided here for guiding the semi-finished product 7.

The stud-shooting means 16 comprises a stud-shooting apparatus 20 which moves a stud 21 in a stud-shooting means 22 back and forth in an electric, pneumatic and/or hydraulic manner. The stud-shooting means 22 coincides with the longitudinal axis of the semi-finished product 7. The stud 21 comprises a lower end which coincides with the diameter of the upper end (head 9) of the semi-finished product 7. The stud-shooting apparatus 20 moves the stud 21 in such a way that the head 9 of the semi-finished product 7 arranged therebeneath is contacted directly by the stud and is shot into the core structure 2. In the example shown the pin insertion direction 22 extends along the y-axis of the core composite 2. If the semi-finished product 7 is at a different angle, the stud-shooting means 16 may be moved accordingly relative to the axes x, y and z of the core composite 2 and this is easily implemented although it is not shown in detail here.

The shot semi-finished product 7 reinforces the core composite 2 in the manner described above. The shape of the tip 8 may be adapted accordingly to the material of the core composite 2 by selecting corresponding machining tools 19 for the machining means 14.

In the example shown here the device 10 comprises a control means, for example one or more microcontrollers, which monitor(s) and control(s) all means and processes. This may occur in a fully automated manner.

A plurality of these devices 10 can be arranged simultaneously and/or in parallel.

Although the present invention has been described here on the basis of preferred embodiments, it is not restricted thereto, but can be combined and modified in a multiplicity of different ways.

For example, the continuous semi-finished product 6 can be introduced into the cartridge 17, wherein it is simultaneously sharpened and cut to length.

The cartridges 17 may also have a vacuum means and/or adhesive for the temporary fixing of the respective continuous semi-finished product/semi-finished product. A vacuum means of this type may consist of holes which are subjected to a vacuum, these holes being arranged in such a way (for example in the longitudinal direction of the respective semi-finished product/workpiece) that the respective semi-finished product/workpiece can be drawn through.

In a method for reinforcing a substrate or textile of a core structure 2 of a component, for example of an aircraft or spacecraft, the following method steps are carried out: a continuous semi-finished product 6 is fed, via a feed means 12, into a cartridge 17 of a conveying means 15 which comprises a plurality of cartridges 17; the continuous semi-finished product 6 is cut to length using a cutting means 13 in order to produce a cut, reinforcing semi-finished product 7 which is received in the cartridge 17; the cartridge 17 is conveyed to a machining means 14; the cut, reinforcing semi-finished product 7 is sharpened by the machining means 14; the cartridge 17 is conveyed to a textile or substrate to be reinforced of a core structure 2; and the sharpened semi-finished product 7 is shot into the textile or substrate of a core structure 2 by a stud-shooting means 16. A corresponding device carries out the method, a component is produced by the method and/or by the device, and an aircraft or spacecraft comprises a component of this type.

Preferred Embodiments of the Present Invention

1. Method for reinforcing a substrate or a textile of a core structure (2) of a component, for example of an aircraft or spacecraft, comprising the following method steps:
    (i) feeding a continuous semi-finished product (6), via a feed means (12), into a cartridge (17) of a conveying means (15) which comprises a plurality of cartridges (17);
    (ii) cutting to length the continuous semi-finished product (6) using a cutting means (13) in order to produce a cut, reinforcing semi-finished product (7) which is received in the cartridge (17);
    (iii) conveying the cartridge (17) to a machining means (14);
    (iv) sharpening the cut, reinforcing semi-finished product (7) using the machining means (14);
    (v) conveying the cartridge (17) to a substrate or textile to be reinforced of a core structure (2); and
    (vi) shooting the sharpened semi-finished product (7) into the substrate or textile of the core structure (2) using a stud-shooting means (16).

2. Method for reinforcing a substrate or a textile of a core structure (2) of a component, for example of an aircraft or spacecraft, comprising the following method steps:
    (i') feeding a continuous semi-finished product (6), via a feed means (12), into a cartridge (17) of a conveying means (15) which comprises a plurality of cartridges (17);
    (ii') sharpening the free end of the continuous semi-finished product (7) using a machining means (14);
    (iii') cutting to length the sharpened continuous semi-finished product (6) using a cutting means (13) in order to produce a cut, reinforcing semi-finished product (7) which is received in the cartridge (17);
    (iv') conveying the cartridge (17) to a substrate or textile to be reinforced of a core structure (2); and
    (v') shooting the sharpened semi-finished product (7) into the substrate or textile of the core structure (2) using a stud-shooting means (16).

3. Method according to embodiment 1 or embodiment 2, characterised in that
the continuous semi-finished product (6) is cut to length for presettable lengths.

4. Method according to at least one of the preceding embodiments, characterised in that
the conveying means (15) moves a plurality of cartridges (17) forwards in an endless loop either continuously or intermittently, whereby in each case the semi-finished products (7) introduced into the respective cartridges (17) are transported from the feed means (12) to the stud-shooting means (16).

5. Method according to at least one of the preceding embodiments, characterised in that the semi-finished products (7) are shot into the textile or substrate of the core structure (2) in previously determinable directions relative to the main axes of the textile or core structure (2).

6. Method according to embodiment 5, characterised in that the semi-finished products (7) are shot by a respectively adapted stud (22) of the stud-shooting means (16), the stud being moved substantially in the longitudinal direction of the semi-finished products (7).

7. Device (10) for reinforcing a substrate or a textile of a core structure (2) of a component, for example of an aircraft or spacecraft, comprising:
a feed means (12) for feeding a continuous semi-finished product (6) to a cartridge (17);
a conveying means (15) comprising a plurality of cartridges (17);
a cutting means (13) for producing a semi-finished product (7) received in the cartridge (17);
a machining means (14) for sharpening the cut, reinforcing semi-finished product (7);
a stud-shooting means (16) for shooting the sharpened semi-finished product (7) into the substrate or the textile of a core structure (2); and
a conveying means (15) for conveying the cartridge (17).

8. Device (10) according to embodiment 7, characterised in that
the conveying means (15) comprises a plurality of cartridges (17) for receiving the continuous semi-finished product (6) and the semi-finished products (7).

9. Device (10) according to embodiment 8, characterised in that
the cartridges (17) are arranged against one another in an endless loop.

10. Device (10) according to at least one of embodiments 7 to 9, characterised in that
the machining means (14) for sharpening a respective end of the semi-finished products (7) is configured as a sharpening machine.

11. Device (10) according to at least one of embodiments 7 to 10, characterised in that
the stud-shooting means (16) comprises a stud (22) which is arranged movably in the longitudinal direction of the semi-finished product (7).

12. Device (10) according to embodiment 11, characterised in that,
if the semi-finished product (7) is nail-like or needle-like, the stud (22) has a diameter at its end facing the semi-finished product (7) which basically corresponds to the diameter of the end of the semi-finished product (7) facing the stud (22).

13. Device (10) according to embodiment 11, characterised in that,
if the semi-finished product (7) is staple-like then the stud (22) has a width at its end facing the staple-like semi-finished product (7) which basically corresponds to the width of the end of the staple-like semi-finished product (7) facing the stud (22).

14. Device (10) according to at least one of embodiments 7 to 13, characterised in that
the stud-shooting means (22) comprises an electric, pneumatic and/or hydraulic drive.

15. Component of an aircraft or spacecraft, characterised in that
the component comprises at least one portion with a reinforcement of a substrate or a textile of a core structure (2), the reinforcement being produced in accordance with a method according to at least one of embodiments 1 to 6 and/or by a device according to at least one of embodiments 7 to 14.

LIST OF REFERENCE NUMERALS 1 core composite
2 core structure
3 cover ply
4 pin
5 fold
6 continuous semi-finished product
7 semi-finished product
8 tip
9 head
10 device
11 continuous semi-finished product store
12 feed means
13 cutting means
14 machining means
15 conveying means
16 stud-shooting means
17 cartridge
18 cartridge inlet
19 machining tool
20 stud-shooting apparatus
21 stud
22 stud-shooting means
23 stop
V1 continuous semi-finished product feed direction
V2 feed means feed direction
x, y, z coordinates

The invention claimed is:

1. A method for reinforcing a substrate or a textile of a core structure of a component, comprising:
(i) feeding a continuous semi-finished product, via a feeder, into a first cartridge of a conveyor, the conveyor comprising a plurality of cartridges;
(ii) cutting to length the continuous semi-finished product using a cutter in order to produce a cut, reinforcing semi-finished product which is received in the first cartridge;
(iii) conveying the first cartridge to a machine;
(iv) sharpening the cut, reinforcing semi-finished product using the machine;
(v) conveying the first cartridge to the substrate or textile to be reinforced; and
(vi) shooting the sharpened semi-finished product into the substrate or textile of the core structure using a stud-shooter.

2. A method for reinforcing a substrate or a textile of a core structure of a component, comprising:
(i') feeding a continuous semi-finished product, via a feeder, into a first cartridge of a plurality of cartridges of a conveyor;
(ii') sharpening a free end of the continuous semi-finished product using a machine;
(iii') cutting to length the sharpened continuous semi-finished product using a cutter in order to produce a cut semi-finished product which is received in the first cartridge;
(iv') conveying the first cartridge to the substrate or textile of the core structure to be reinforced; and
(v') shooting the sharpened semi-finished product into the substrate or textile of the core structure using a stud-shooter.

3. The method according to claim 1, wherein the conveyor moves the plurality of cartridges forwards in an endless loop either continuously or intermittently, whereby in each case the semi-finished products introduced into the respective cartridges are transported from the feeder to the stud-shooter.

4. The method according to claim 1, wherein the semi-finished products are shot into the textile or substrate of the core structure in previously determinable directions relative to the main axes of the textile or core structure.

5. A device for reinforcing a substrate or a textile of a core structure of a component, comprising:
   a conveyor comprising a plurality of cartridges;
   a feeder configured to feed a continuous semi-finished product to a respective cartridge of the plurality of cartridges;
   a cutter configured to cut a length of the continuous semi-finished product to produce a semi-finished product which is received in the respective cartridge;
   a machine configured to machine and sharpen an end of the cut semi-finished product; and
   a stud-shooter configured to shoot the sharpened semi-finished product from the respective cartridge into the substrate or the textile of the core structure;
   wherein the conveyor is configured to convey each of the plurality of cartridges to the stud-shooter.

6. The device according to claim 5, wherein the stud-shooter comprises a stud which is arranged movably in a longitudinal direction of the semi-finished product and has a diameter at an end thereof facing the semi-finished product which corresponds substantially to a diameter of an end of the semi-finished product facing the stud.

7. The device according to claim 5, wherein the cartridges are arranged adjacent one another in an endless loop.

8. The device according to claim 5, wherein the stud-shooter comprises an electric, pneumatic and/or hydraulic drive.

9. The method according to claim 1, wherein the component is a core composite component of an aircraft or spacecraft.

10. The method according to claim 2, wherein the component is a core composite component of an aircraft or spacecraft.

11. The device according to claim 5, wherein the component is a core composite component of an aircraft or spacecraft.

12. The method according to claim 1, wherein the machine comprises a machining means.

13. The method according to claim 2, wherein the machine comprises a machining means.

* * * * *